United States Patent

Lieggi

[11] Patent Number: 5,518,352
[45] Date of Patent: May 21, 1996

[54] RELIEF SCREW

[76] Inventor: Martin Lieggi, 11 Chestnut Ave., Staten Island, N.Y. 10305

[21] Appl. No.: 324,096

[22] Filed: Oct. 17, 1994

[51] Int. Cl.⁶ .......................... F16B 23/00; F16B 35/06
[52] U.S. Cl. .......................... 411/399; 411/188; 411/959
[58] Field of Search .................................. 411/399, 404, 411/412, 413, 919, 957, 959, 187, 188

[56] References Cited

U.S. PATENT DOCUMENTS

| | | | |
|---|---|---|---|
| 1,238,636 | 8/1917 | Christofferson | 411/399 |
| 2,199,809 | 5/1940 | Pigott . | |
| 2,764,053 | 9/1956 | Lovisek | 411/399 |
| 3,056,234 | 10/1962 | Nelsson et al. . | |
| 3,177,755 | 4/1965 | Kahn . | |
| 3,903,784 | 9/1975 | Dekker . | |
| 4,653,244 | 3/1987 | Farrell . | |
| 5,199,839 | 4/1993 | DeHaitre | 411/399 X |

FOREIGN PATENT DOCUMENTS 13368   6/1912   United Kingdom .................. 411/399

*Primary Examiner*—Neill R. Wilson
*Attorney, Agent, or Firm*—Michael I. Kroll

[57] ABSTRACT

An improved relief screw is provided for installing a wallboard panel to a stud, which consists of a flat head made of an inverted rectilinear slant height frustrum portion and a straight thin cylindrical portion. The straight thin cylindrical portion is larger than the widest part of the rectilinear slant height frustrum portion, therefore creating an annular flange thereabout. A threaded shank with a conical point extends from a narrow part of the rectilinear slat height frustrum portion, while the flat head bas a recess to accommodate a driving tool element for imparting rotary motion thereto. A structure is in the flat head for relieving particles of the wallboard panel therefrom, after the flat head is driven into the wallboard panel. The top of the straight thin cylindrical portion will be flush with and not damage the outer surface of the wallboard panel, while the annular flange will add more gripping support thereto.

2 Claims, 2 Drawing Sheets

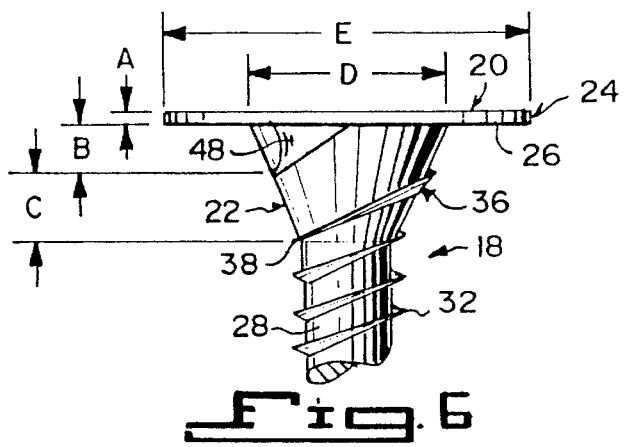
Fig. 6
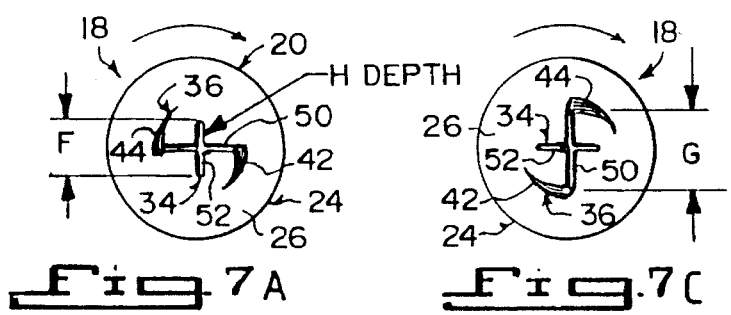
Fig. 7A    Fig. 7C
Fig. 7B    Fig. 7D
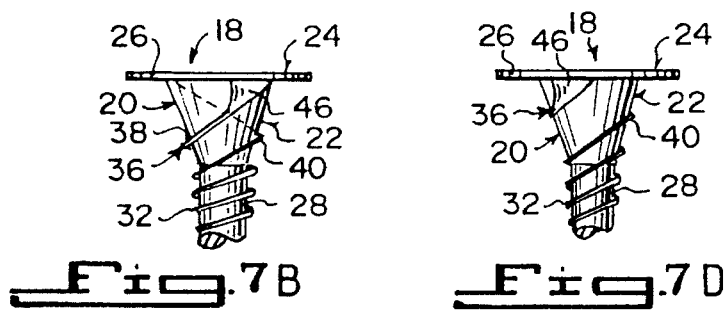
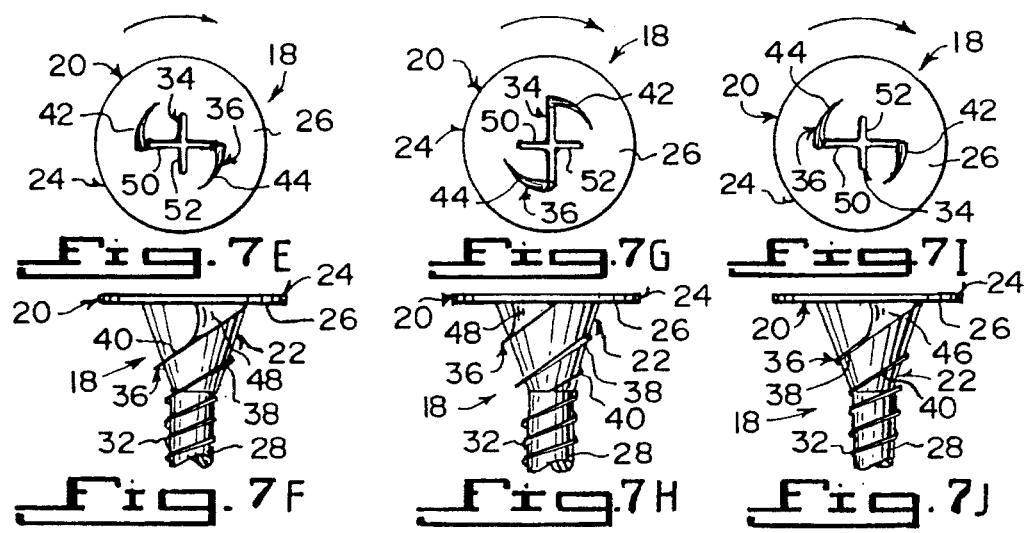
Fig. 7E    Fig. 7G    Fig. 7I
Fig. 7F    Fig. 7H    Fig. 7J

RELIEF SCREW

BACKGROUND OF THE INVENTION

1. Field of the Invention

The instant invention relates generally to threaded fasteners and more specifically it relates to an improved relief screw.

2. Description of the Prior Art

Numerous threaded fasteners have been provided in prior art that are adapted to attach various articles together. While these units may be suitable for the particular purpose to which they address, they would not be as suitable for the purposes of the present invention as heretofore described.

For example, U.S. Pat. No. 2,199,809 to Pigott teaches a bolt with a multi-layered head of decreasing diameter. Its threads do not continue all the way to the head. Thread threads on the shaft are for a nut, so that access behind the wall is a necessity.

U.S. Pat. No. 3,056,234 to Nelsson et al. teaches a screw with a head that is frustum shaped having a non-rectilinear slat height (curved not straight). There is no flange present on its head.

U.S. Pat. No. 3,177,755 to Kahn teaches a screw with a multi-layered head of decreasing diameter. Its threads do not continue all the way to its head. Its head is frustum shaped with a non-rectilinear slant height (curved not straight). There is no flange present on its head and its head is textured.

U.S. Pat. No. 3,903,784 to Dekker teaches a screw with a head that is frustum shaped and contains a plurality of cutters around its slant height. Its threads do not continue all the way from its tip to its head.

U.S. Pat. No. 4,653,244 to Farrell teaches a screw with a head that is frustum shaped with a non-rectilinear slant height (curved not straight). There are both right handed and left handed threads on its shaft. Its head flange is textured and there is a second frustum on its shaft mating with its head.

SUMMARY OF THE INVENTION

A primary object of the present invention is to provide an improved relief screw for installing a wallboard panel to a stud that will overcome the shortcomings of the prior art devices.

Another object is to provide an improved relief screw that includes a wide flat flange as part of its flat head, that will not damage the outer surface of the wallboard panel, wile adding more support thereto.

An additional object is to provide an improved relief screw that is structured to allow particles of the wallboard panel to exit the flat head after the screw is driven therein, so that the flat head will sit flush with the outer surface of the wallboard panel.

A further object is to provide an improved relief screw that is simple and easy to use.

A still further object is to provide an improved relief screw that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 6 is an enlarged elevational view of the flat head portion of the instant invention.

FIGS. 7A through 7J are both top and elevational views of the flat head portion, showing various rotational positions thereof.

DETAILED DESCRIPTION OF THE PREFERRED EMBODIMENTS

Figure 1:
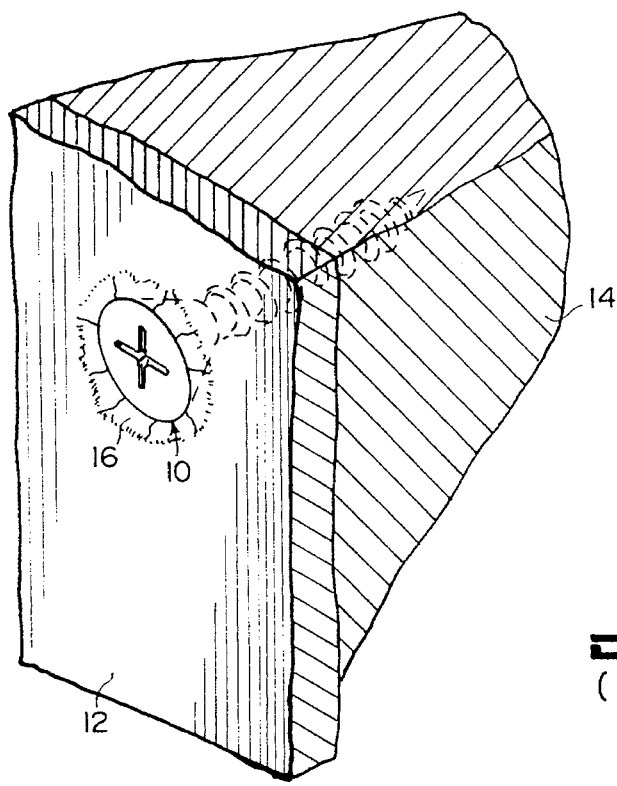
FIG. 1 is a perspective view of the prior art being a standard flat head screw attaching a piece of wallboard panel to a stud.
Figure 2:
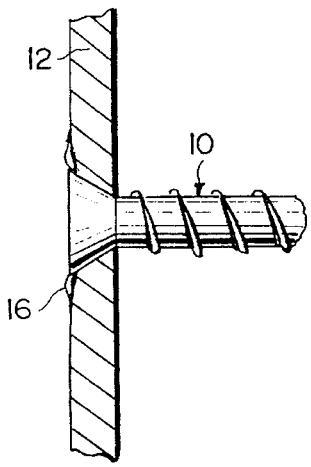
FIG. 2 is a side cross sectional view with parts broken away of the piece of wallboard panel with the prior art therethrough.
Figure 3:
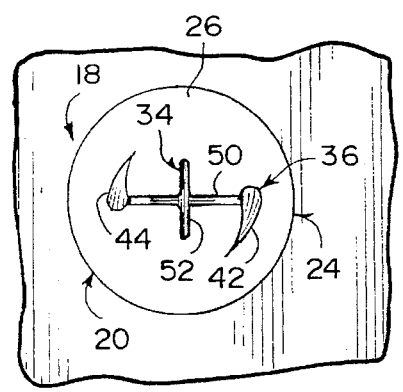
FIG. 3 is a front view of the instant invention installed in a piece of wallboard panel.
Figure 4:
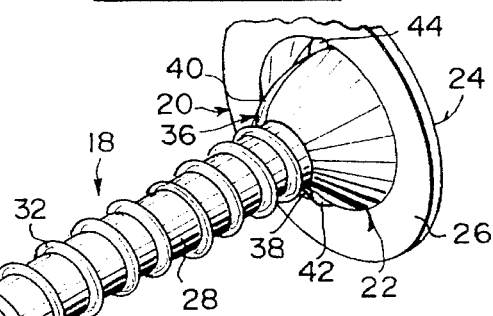
FIG. 4 is a rear perspective view of the instant invention per se, with a portion of the cylinder portion of the flat head broken away.
Figure 5:
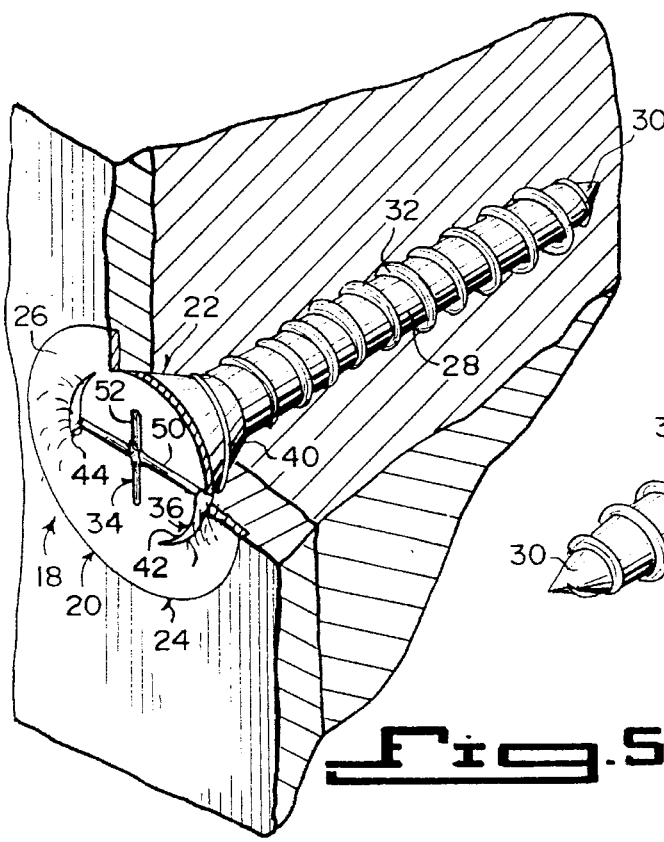
FIG. 5 is a front perspective view with parts broken away, of the instant invention attaching the piece of wallboard panel to a stud.

Turning now descriptively to the drawings, in which similar reference characters denote similar elements throughout the several views, FIGS. 1 and 2 show the prior art, as previously discussed, being a standard flat head screw 10 threaded into a piece of wallboard panel 12 and stud 14, whereby the flat head screw 10 damages the wallboard panel 12 at 16. The wallboard panel 12 can be a wounder board or a glass mesh mortar unit.

The invention shown in FIGS. 3 through 7 is an improved relief screw 18 for installing the wallboard panel 12 to the stud 14. The screw 18 consists of a flat head 20, being made up of an inverted rectilinear slant height frustrum portion 22 and a straight thin cylindrical portion 24, integrally attached thereto. The straight thin cylindrical portion 24 has a diameter "E" greater than a diameter "D" of a widest part of the rectilinear slant height frustrum portion 22, therefore creating an annular flange 26 thereabout. An elongated shank 28 has a conical point 30 integrally formed at a first end, while a second end of the shank 28 is integrally formed with a narrow part of the rectilinear slant height frustrum portion 22. Threads 32 spiral the shank 28 from the narrow part of the rectilinear slant height frustrum portion 22 to the conical point 30. The straight thin cylindrical portion 24 of the flat head 28, has a recess 34 to accommodate a driving tool element (not shown) for imparting rotary motion thereto, so as to drive the shank 28 with the threads 32 past the wallboard panel 12 and into the stud 14. A structure 36 is in the flat head 20, for relieving particles of the wallboard panel 12 therefrom after the flat head 20 is driven into the wallboard panel 12. The top of the straight thin cylindrical portion 24 will be flush with the outer surface of the wallboard panel 12 and not damage the outer surface of the wallboard panel 12, while the annular flange 26 will add more gripping support thereto. The recess 34 is a Phillips type recess, to receive the driving tool element which is a Phillips head screwdriver.

The particles relieving structure 36 includes a pair of auger threads 38, 40 oppositely spiraling on the rectilinear slant height frustrum portion 22 from the second end of the shank 28, to a short distance below the straight thin cylindrical portion 24. The straight thin cylindrical portion 24 has a pair of oppositely positioned slotted curved teardrop shaped apertures 42, 44, extending through directly above the diameter "D" of the widest part of the rectilinear slant height frustrum portion 22. The rectilinear slant height frustrum portion 22 has a pair of feathered recesses 46, 48, each extending between an end of one auger thread 38, 40 and one slotted curved teardrop shaped aperture 42, 44, for carrying the particles of the wallboard panel 12 out therefrom.

The Phillips type recess 34 contains one cross slot 50, being longer than another cross slot 52. The longer cross slot 50 can extend across to engage with the slotted curved teardrop shaped apertures 42, 44 at their widest points, to help guide the particles of the wallboard panel 12 out therefrom.

OPERATION OF THE INVENTION

To install the wallboard panel 12 to the stud 14, the following steps should be taken:

1. Introduce into the wallboard panel 12 the improved relief screw 18.

2. Insert the driving tool element into the recess in the straight thin cylindrical portion of the flat head.

3. Rotate the driving tool element, so that the conical point proceeds through the wallboard panel and into the stud, until the top of the straight thin cylindrical portion is flush with the outer surface of the wallboard panel.

| TYPICAL DIMENSIONS IN INCHES FOR THE IMPROVED RELIEF SCREW 18 | |
|---|---|
| A | 1/32 |
| B | 1/16 |
| C | 2/16 |
| D | 4/16 |
| E | 7/16 |
| F | 3/16 |
| G | 4/16 |
| H | 2/16 |

The table is representative of typical dimensions, but is not restricted to these dimensions.

LIST OF REFERENCE NUMBERS 10 standard flat head screw
12 piece of wallboard panel
14 stud
16 damage in the 12 caused by 10
18 improved relief screw
20 flat head of 18
22 inverted rectilinear slant height frustrum portion
24 straight thin cylindrical portion
26 annular flange on 24
28 elongated shank
30 conical point on 28
32 threads on 28
34 recess in 24
36 particles relieving structure
38 first auger thread
40 second auger thread
42 first slotted curved teardrop shaped aperture
44 second slotted curved teardrop shaped aperture
46 first feathered recess
48 second feathered recess
50 long cross slot of 34
52 short cross slot of 34
A thickness of
B height of upper segment of 22
C height of lower segment of 22
D diameter of wide part of 22
E diameter of 24
F length of 52
G length of 50
H depth of recess 34

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved relief screw for installing a wallboard panel to a stud which comprises:

a) a flat head being made up of an inverted rectilinear slant height frustrum portion and a straight thin cylindrical portion integrally attached thereto, said straight thin cylindrical portion having a diameter greater than a diameter of a widest part of said rectilinear slant height frustrum portion, therefore creating an annular flange thereabout;

b) an elongated shank having a conical point integrally formed at a first end, while a second end of said shank is integrally formed with a narrow part of said rectilinear slant height frustrum portion;

c) threads spiraling said shank from the narrow part of said rectilinear slant height frustrum portion to the conical point;

d) said straight thin cylindrical portion of said flat head having a recess to accommodate a driving tool element for imparting rotary motion thereto, so as to drive said shank with said threads past the wallboard panel and into the stud, said recess being a Phillips type recess to receive the driving tool element which is a Phillips head screwdriver; and e) means in said flat head for relieving particles of the wallboard panel therefrom after said flat head is driven into the wallboard panel, so that the top of said straight thin cylindrical portion will be flush with the outer surface of the wallboard panel, while said annular flange will add more gripping support thereto, said particles reliving means including a pair of auger threads oppositely spiraling on said rectilinear slant height frustrum portion from the second end of said shank to a short distance below said straight thin cylindrical portion, said straight thin cylindrical portion having a pair of oppositely positioned slotted curved teardrop shaped apertures extending through directly above the diameter of the widest part of said rectilinear slant height frustrum portion, and said rectilinear slant height frustrum portion having a pair of leathered recesses, each extending between an end of one said auger thread and one said slotted curved teardrop shaped aperture, for carrying the particles of the wallboard panel off therefrom.

2. An improved relief screw as recited in claim 1, wherein said Phillips type recess includes one cross slot being longer than another cross slot, so that said longer cross slot can extend across to engage with said slotted curved teardrop shaped apertures at their widest points, to help guide the particles of the wallboard panel out therefrom.

* * * * *